United States Patent
Horng et al.

(10) Patent No.: US 10,910,908 B2
(45) Date of Patent: Feb. 2, 2021

(54) MOTOR

(71) Applicant: Sunonwealth Electric Machine Industry Co., Ltd., Kaohsiung (TW)

(72) Inventors: Alex Horng, Kaohsiung (TW); Wen-Nan Chou, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 123 days.

(21) Appl. No.: 16/133,816

(22) Filed: Sep. 18, 2018

(65) Prior Publication Data

US 2019/0207466 A1 Jul. 4, 2019

(30) Foreign Application Priority Data

Dec. 29, 2017 (TW) .............................. 106146523 A (51) Int. Cl.
*H02K 5/167* (2006.01)
*F16C 32/06* (2006.01)
*F16C 17/04* (2006.01)

(52) U.S. Cl.
CPC ......... *H02K 5/1675* (2013.01); *F16C 17/045* (2013.01); *F16C 32/0629* (2013.01); *F16C 32/0692* (2013.01); *F16C 2370/12* (2013.01); *F16C 2380/26* (2013.01); *H02K 2205/03* (2013.01)

(58) Field of Classification Search
CPC .... H02K 5/1675; H02K 5/163; F16C 17/045; F16C 32/0629; F16C 32/0692; F16C 2370/12; F16C 2380/26
See application file for complete search history.

(56) References Cited

U.S. PATENT DOCUMENTS

| | | | | |
|---|---|---|---|---|
| 6,467,963 B2* | 10/2002 | Sakuragi | ............... | F16C 17/107 384/107 |
| 6,657,342 B2* | 12/2003 | Kodama | ............... | F16C 17/107 310/67 R |
| 6,717,310 B2* | 4/2004 | Yoshikawa | ............. | F16C 17/26 310/67 R |
| 7,021,829 B2* | 4/2006 | Tamaoka | ............... | F16C 17/107 384/112 |
| 7,196,868 B2* | 3/2007 | Asada | ................... | F16C 17/107 360/98.07 |

(Continued)

FOREIGN PATENT DOCUMENTS

CN 102377263 A 3/2012

*Primary Examiner* — Jeremy A Luks
(74) *Attorney, Agent, or Firm* — Alan D. Kamrath; Karin L. Williams; Mayer & Williams PC (57) ABSTRACT

A motor includes a base, a stator, a dynamic pressure bearing unit and a rotor. The base includes a shaft tube. The shaft tube includes a closed end and an open end. The stator is mounted around the shaft tube. The dynamic pressure bearing unit includes a bearing, a dynamic pressure assembly and a thrust plate. The bearing is received in the shaft tube. The dynamic pressure assembly and the thrust plate are disposed in a position relatively adjacent to the open end of the shaft tube and relatively distant from the closed end of the shaft tube. The dynamic pressure assembly is located between the bearing and the thrust plate. A lubricating fluid layer is disposed between the dynamic pressure assembly and the thrust plate. The rotor is connected to the thrust plate and is rotatably coupled with the bearing.

26 Claims, 10 Drawing Sheets

(56) References Cited

U.S. PATENT DOCUMENTS

| | | | | |
|---|---|---|---|---|
| 7,589,934 B2* | 9/2009 | Asada | ............... | F16C 17/107 |
| | | | | 360/99.08 |
| 7,830,637 B2* | 11/2010 | Asada | ............... | F16C 17/107 |
| | | | | 310/67 R |
| 8,164,850 B2* | 4/2012 | Gomyo | ............... | F16C 33/107 |
| | | | | 360/98.07 |
| 8,599,513 B1* | 12/2013 | Kimura | ............... | F16C 32/0633 |
| | | | | 360/97.11 |
| 8,736,123 B2 | 5/2014 | Jang | | |
| 2010/0207470 A1* | 8/2010 | Kim | ............... | F16C 17/045 |
| | | | | 310/90 |
| 2013/0127274 A1* | 5/2013 | Lee | ............... | G11B 19/2036 |
| | | | | 310/90 |
| 2013/0140961 A1* | 6/2013 | Kim | ............... | H02K 15/14 |
| | | | | 310/40 R |
| 2013/0249337 A1* | 9/2013 | Kim | ............... | H02K 5/163 |
| | | | | 310/90 |
| 2013/0320793 A1* | 12/2013 | Han | ............... | G11B 19/2036 |
| | | | | 310/90 |

* cited by examiner

MOTOR

CROSS REFERENCE TO RELATED APPLICATION

The application claims the benefit of Taiwan application serial No. 106146523, filed on Dec. 29, 2017, and the entire contents of which are incorporated herein by reference.

BACKGROUND OF THE INVENTION

1. Field of the Invention

The present invention generally relates to a motor and, more particularly, to a motor including a dynamic pressure bearing unit.

2. Description of the Related Art

Figure 1:
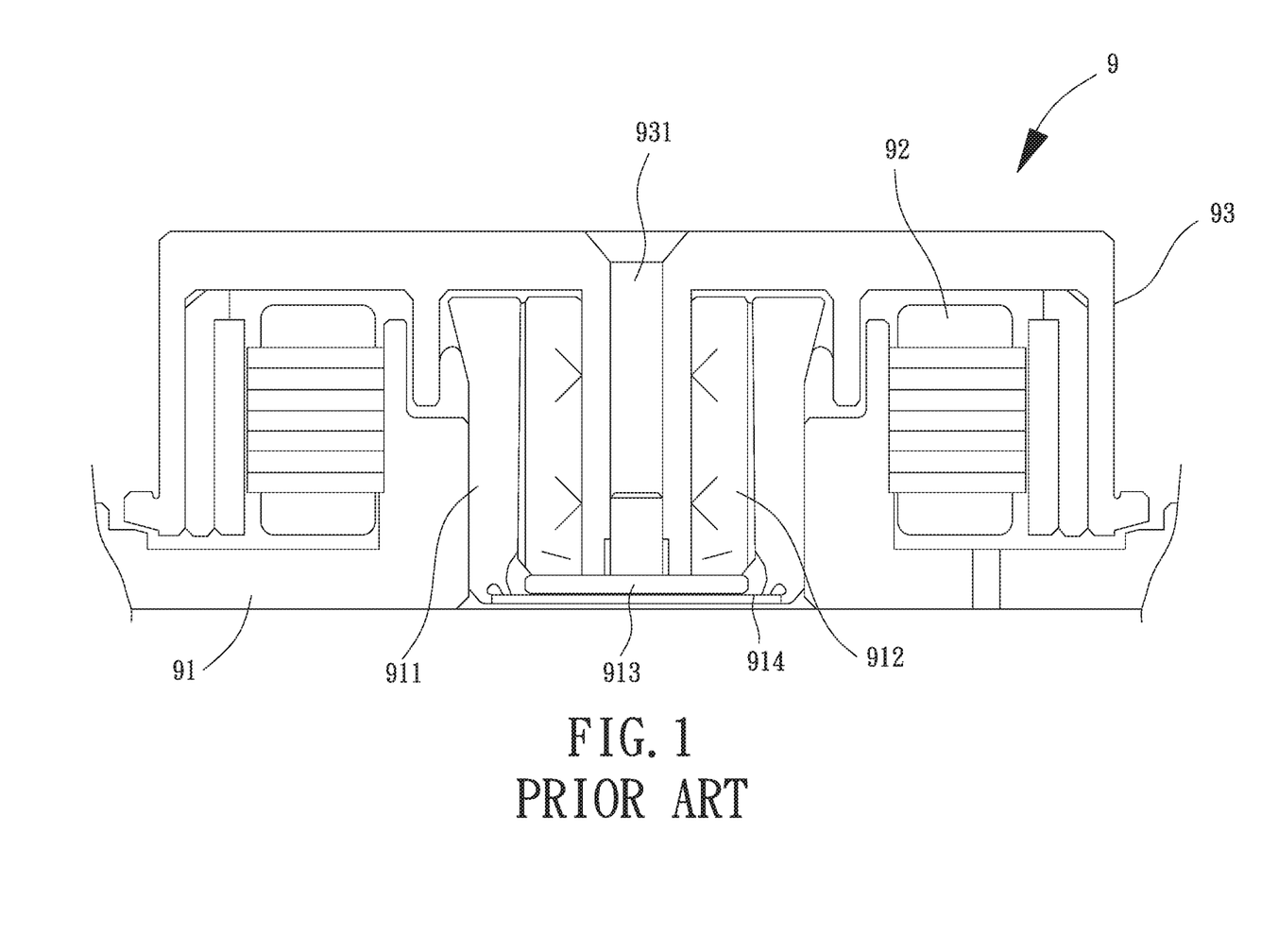
FIG. 1 is a cross-sectional view of a conventional motor.

FIG. 1 shows a conventional motor 9 including a seat 91, a stator 92 and a rotor 93. The seat 91 is coupled with a bearing case 911. The bearing case 911 receives a bearing 912 and a pushing plate 913. Each of two ends of the bearing case 911 includes an opening. A cover plate 914 is mounted to one of the two ends of the bearing case 911. A shaft 931 of the rotor 93 extends into the bearing case 911 through another of the two ends of the bearing case 911, such that the shaft 931 is rotatably coupled with the bearing 912. An end of the shaft 931 abuts the pushing plate 913. The stator 92 is coupled with an outer periphery of the bearing case 911. An example of such a motor 9 is disclosed by U.S. Pat. No. 7,021,829 (China Patent Publication No. 1576623A) entitled "Fluid-Dynamic-Pressure Bearing, Spindle Motor Furnished with the Fluid-Dynamic-Pressure Bearing, Method of Manufacturing Rotor Assembly applied in the Spindle Motor, and Recording-Disk Drive Furnished with the Spindle Motor."

In the conventional motor 9, a bottom end of the bearing case 911 needs to include an opening. In this structure, the bearing 912 and the pushing plate 913 can be inserted into the bearing case 911 through the opening. After assembly, the bottom end of the bearing case 911 is sealed by the cover plate 914. Since it is necessary to inject a lubricating fluid into the bearing case 911, if the cover plate 914 cannot completely seal the bottom end of the bearing case 911, leakage of oil will occur. As a result, the operation of the motor 9 is affected.

In light of this problem, another conventional motor is provided where an adhesive is applied to the cover plate after the cover plate is mounted to the bottom end of the bearing case. After solidification, the adhesive can ensure a complete sealing effect. However, this motor requires more components and has an inefficient assembly. An example of such a motor is disclosed by U.S. Pat. No. 6,717,310 (China Patent Publication No. 1391325A) entitled "Spindle Motor and Method for Assembling the same."

Besides, in a further conventional motor, the bearing case is designed with a closed end and an open end. A pushing plate and a bearing are inserted into the bearing case via the open end. Thus, the structure of the motor is simplified and the oil does not leak through the bottom end of the bearing case. However, it is troublesome to carry out the procedures such as inserting the components (the pushing plate and the bearing) into the bearing case via the open end, pushing the components towards the closed end of the bearing case, and precisely positioning the components inside the bearing case while ensuring a press fit between some of the components and an inner periphery of the bearing case. Thus, the assembly of the motor is still inconvenient.

In light of this, it is necessary to improve the conventional motors.

SUMMARY OF THE INVENTION

It is therefore the objective of this invention to provide a motor whose dynamic pressure bearing unit is mounted adjacent to an open end of the shaft tube, significantly improving the convenience in assembly of the motor.

In an aspect, a motor including a base, a stator, a dynamic pressure bearing unit and a rotor are disclosed. The base includes a shaft tube. The shaft tube includes a closed end and an open end. The stator is mounted around the shaft tube. The dynamic pressure bearing unit includes a bearing, a dynamic pressure assembly and a thrust plate. The bearing is received in the shaft tube. The dynamic pressure assembly and the thrust plate are disposed in a position relatively adjacent to the open end of the shaft tube and relatively distant from the closed end of the shaft tube. The dynamic pressure assembly is located between the bearing and the thrust plate. A lubricating fluid layer is disposed between the dynamic pressure assembly and the thrust plate. The rotor is connected to the thrust plate and is rotatably coupled with the bearing.

Based on this, the motor according to the invention can prevent leakage of the lubricating fluid through the arrangement of the closed end of the shaft tube while positioning the dynamic pressure bearing unit in a position adjacent to the open end of the shaft tube. In this arrangement, it is not necessary to push the dynamic pressure bearing unit to the closed end of the shaft tube, significantly improving the convenience in assembly of the motor.

In an example, an outer periphery of the thrust plate is spaced from an inner periphery of the shaft tube to form an oil spacing. In this arrangement, a lubricating fluid can be injected into the oil spacing from between the dynamic pressure assembly and the thrust plate, improving the smoothness of the thrust plate rotating relative to the dynamic pressure assembly.

In an example, the oil spacing gradually reduces from an upper position relatively adjacent to the open end of the shaft tube to a lower position relatively distant from the open end of the shaft tube. In this arrangement, the convenience in injecting the oil is improved.

In an example, the lubricating fluid layer has a thickness of 0.01-0.1 mm. Thus, it can be ensured that the thrust plate can smoothly rotate relative to the dynamic pressure assembly.

In an example, the open end of the shaft tube has an opening, and the dynamic pressure assembly is coupled with the shaft tube and abuts an end of the bearing facing the opening. In this arrangement, the bearing can be stably positioned in the shaft tube.

In an example, an outer periphery of the dynamic pressure assembly is coupled with an inner periphery of the shaft tube. Thus, the structural complexity of the dynamic pressure assembly and the shaft tube is simplified.

In an example, the thrust plate includes a narrow portion and a broad portion connected to the narrow portion. The narrow portion and the broad portion are arranged in an axial direction. The lubricating fluid layer forms between the broad portion and the dynamic pressure assembly. A level of the broad portion is not higher than an end face of the open end of the shaft tube. Thus, the amount of the lubricating fluid spilling from inside the shaft tube can be reduced.

In an example, the dynamic pressure assembly further includes a cover coupled with the narrow portion of the thrust plate, and an oil chamber is formed between the cover and the thrust plate. In the arrangement, the lubricating fluid rushing upwards can be kept in the oil chamber and does not easily spill.

In an example, the narrow portion forms a shoulder portion, and the cover abuts the shoulder portion to prevent the cover from making contact with the broad portion. In this arrangement, the lubricating fluid can flow into the oil chamber smoothly, and the cover can be attached to the thrust plate more smoothly.

In an example, the rotor includes a shaft extending through the thrust plate and the dynamic pressure assembly and rotatably coupled with the bearing. Thus, the smoothness of rotation of the rotor can be improved.

In an example, the thrust plate is coupled with the shaft. Thus, the convenience in assembly is improved.

In an example, the thrust plate is coupled to the shaft by laser welding. Thus, the coupling effect between the shaft and the thrust plate can be improved.

In an example, the rotor includes a hub coupled with the shaft, and the thrust plate is coupled with the hub. Thus, the convenience in assembly is improved.

In an example, the shaft does not abut the closed end of the shaft tube. Thus, it can be ensured that the shaft will not make contact with the closed end of the shaft tube during the rotation, thereby improving the smoothness of the rotation.

In an example, a recess is formed on a portion of an inner periphery of the shaft tube located at the closed end, and a bottom end of the shaft faces the recess of the shaft tube. Thus, when the bottom end of the shaft slightly extends out of a bottom end of the shaft tube, it can be ensured that the shaft will not make contact with the closed end of the shaft tube during the rotation. Advantageously, the smoothness of rotation is improved.

In an example, the shaft includes a neck, and an inner periphery of the dynamic pressure assembly forms an extension portion extending into the neck. Thus, the axial movement of the shaft is limited.

In an example, a face of the dynamic pressure assembly facing the thrust plate includes a plurality of dynamic pressure grooves. In this arrangement, the effective thickness and the supporting force of the lubricating fluid layer are increased.

In an example, the dynamic pressure assembly includes an engagement portion and a dynamic pressure portion. The extension portion is located on the engagement portion. The engagement portion of the dynamic pressure assembly abuts the bearing. The dynamic pressure portion of the dynamic pressure assembly is coupled with the shaft tube. The lubricating fluid layer is formed between the dynamic pressure portion and the thrust plate. In this arrangement, it can be ensured that the dynamic pressure assembly can have a larger structural strength.

In an example, the engagement portion includes an end face abutting the dynamic pressure portion, as well as another end face abutting the bearing. Thus, the convenience in respectively forming the engagement portion and the dynamic pressure portion is provided.

In an example, the engagement portion and the dynamic pressure portion are integrally formed with each other. Thus, the convenience and efficiency in assembly are improved.

In an example, the dynamic pressure assembly is a thin plate. Thus, the dynamic pressure assembly is lightweight, reducing the axial height of the motor.

In an example, the dynamic pressure assembly includes a reinforcing member coupled with a bottom of the dynamic pressure portion. Thus, the structural strength of the dynamic pressure assembly can be improved, thereby improving the engagement reliability between the dynamic pressure assembly and the shaft tube.

In an example, the reinforcing member is a plate, an outer periphery of the dynamic pressure portion and an outer periphery of the reinforcing member are press fit with the shaft tube. In this arrangement, the convenient manufacturing and assembly of the reinforcing member is improved.

In an example, the reinforcing member is a plate with a receiving portion, the dynamic pressure portion is received in the receiving portion, and an outer periphery of the reinforcing member is press fit with the shaft tube. Thus, the engagement effect between the dynamic pressure portion and the reinforcing member is reinforced.

In an example, a motor including a base, a stator, a dynamic pressure bearing unit and a rotor is disclosed. The base includes a shaft tube. The shaft tube includes a closed end and an open end. The stator is mounted around the shaft tube. The dynamic pressure bearing unit includes a bearing and a dynamic pressure assembly. The bearing is received in the shaft tube. The dynamic pressure assembly is disposed in a position relatively adjacent to the open end of the shaft tube and relatively distant from the closed end of the shaft tube. The rotor includes a hub and a shaft. The shaft extends through the dynamic pressure assembly and is rotatably coupled with the bearing. The hub is coupled with the shaft and includes a thrust portion. A lubricating fluid layer is disposed between the thrust portion and the dynamic pressure assembly. Based on this, the motor can not only improve the convenience in assembly as stated above, but also simplify the structure of the motor to reduce the manufacturing cost.

In an example, the shaft includes a neck, and wherein an inner periphery of the dynamic pressure assembly forms an extension portion extending into the neck. Thus, the axial movement of the shaft is limited.

In an example, the dynamic pressure assembly includes an engagement portion and a dynamic pressure portion. The extension portion is located on the engagement portion. The engagement portion of the dynamic pressure assembly abuts the bearing. The dynamic pressure portion of the dynamic pressure assembly is coupled with the shaft tube. A face of the dynamic pressure portion facing the thrust portion includes a plurality of dynamic pressure grooves in order to form the lubricating fluid layer between the dynamic pressure portion and the thrust portion. Thus, it can be ensured that the dynamic pressure assembly can have a larger structural strength.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "inner", "outer", "top", "bottom", "axial", "radial", "height" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
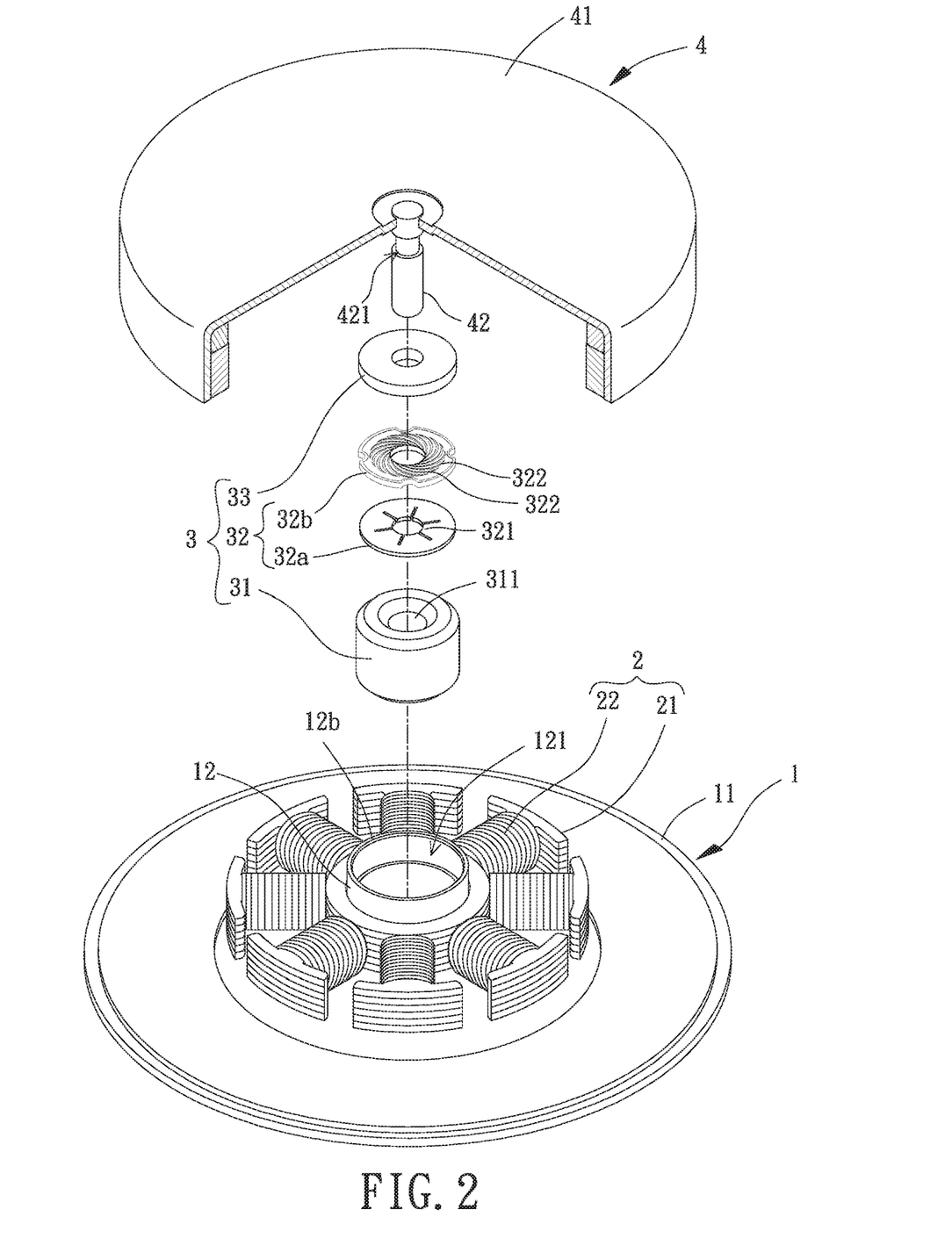
FIG. 2 is an exploded view of a motor of a first embodiment according to the invention.
Figure 3:
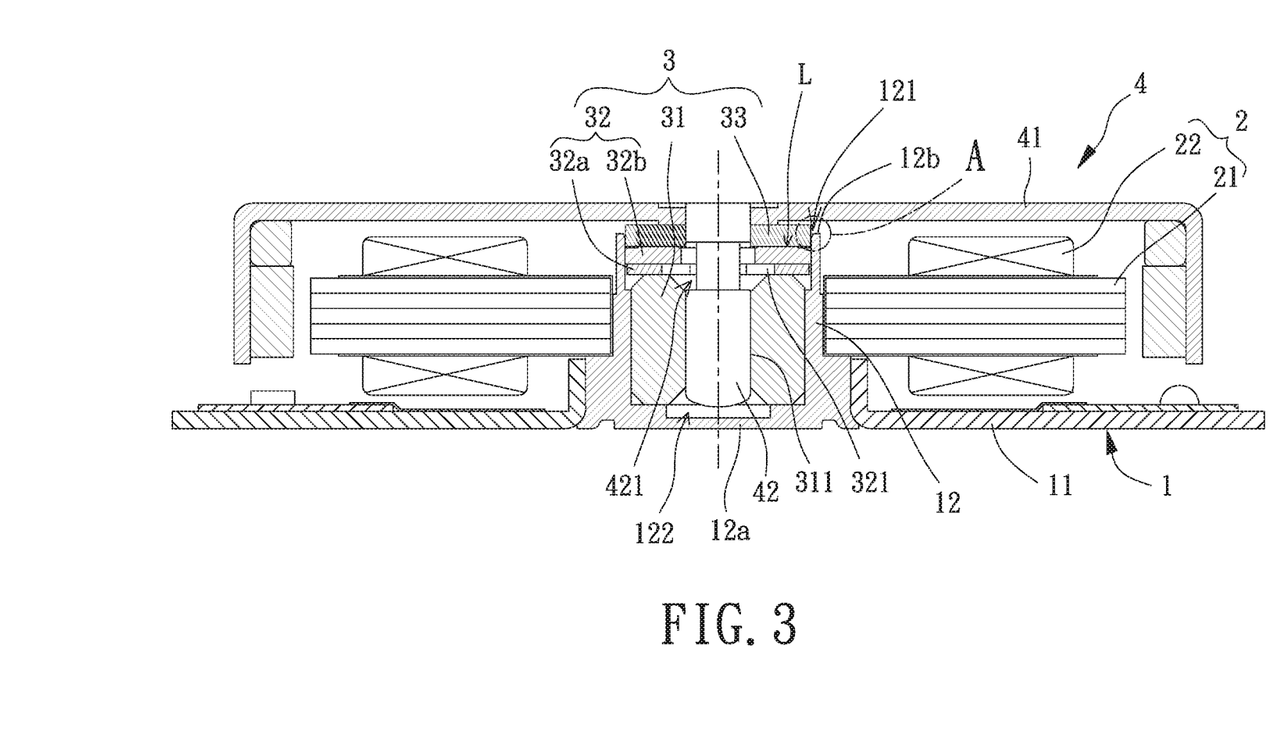
FIG. 3 is a cross-sectional, assembled view of the motor of the first embodiment according to the invention.

FIGS. 2 and 3 show a motor of a first embodiment according to the invention. The motor includes a base 1, a stator 2, a dynamic pressure bearing unit 3 and a rotor 4. The stator 2 and the dynamic pressure bearing unit 3 are mounted on the base 1. The rotor 4 is rotatably coupled with the dynamic pressure bearing unit 3.

The base 1 includes a base plate 11 and a shaft tube 12. The shaft tube 12 may be coupled with the base plate 11. Alternatively, the shaft tube 12 may be integrally formed with the base plate 11 to simplify the structure of the base 1. The materials of the base plate 11 and the shaft tube 12 are not limited. Preferably, the shaft tube 12 is made of metal material, such that the shaft tube 12 can have a larger structural strength and can be coupled with the dynamic pressure bearing unit 3 more securely. The shaft tube 12 includes a closed end 12a and an open end 12b. The open end 12b includes an opening 121. A recess 122 is preferably formed on a portion of an inner periphery of the shaft tube 12 located at the closed end 12a.

The stator 2 is mounted on the base 1 and around the shaft tube 12. The stator 2 may be of any structure capable of driving the rotor 4 to rotate. As a non-limited example shown in this embodiment, the stator 2 is fit around the shaft tube 12. The stator 2 includes an iron core 21 and a coil unit 22 wound around the iron core 21.

The dynamic pressure bearing unit 3 includes a bearing 31, a dynamic pressure assembly 32 and a thrust plate 33. The bearing 31 is received in the shaft tube 12. The dynamic pressure assembly 32 and the thrust plate 33 are mounted adjacent to the open end 12b of the shaft tube 12. The dynamic pressure assembly 32 is located between the bearing 31 and the thrust plate 33. In this embodiment, the dynamic pressure assembly 32 is press fit with the shaft tube 12 and abuts an end of the bearing 31 facing the opening 121. In this manner, the bearing 31 can be securely positioned in a predetermined location of the shaft tube 12. The thrust plate 33 is connected to the rotor 4. A lubricating fluid layer L is located between the dynamic pressure assembly 32 and the thrust plate 33 (please see FIG. 4 also). The lubricating fluid layer L has a thickness of 0.01 to 0.1 mm, permitting the thrust plate 33 to jointly rotate with the rotor 4 relatively to the dynamic pressure assembly 32 more smoothly.

Specifically, the bearing 31 includes an inner periphery delimiting a shaft hole 311. The rotor 4 is rotatably coupled with the shaft hole 311. An inner periphery of the dynamic pressure assembly 32 forms an extension portion 321. The extension portion 321 is used to limit the axial movement of the rotor 4. A face of the dynamic pressure assembly 32 facing the thrust plate 33 may include a plurality of dynamic pressure grooves 322. The dynamic pressure grooves 322 are configured to be filled with a lubricating fluid to increase the effective thickness and supporting force of the lubricating fluid layer L. The quantity of the dynamic pressure grooves 322 is preferably 12-20, with 16 being more preferred. Each of the dynamic pressure grooves 322 preferably has a depth of 20-30 μm. In a more preferred case, the depth of the dynamic pressure groove 322 is 24-26 μm, attaining the best effect of the dynamic pressure grooves 322 reducing the frictional torque of the rotor 4.

In this embodiment, the dynamic pressure assembly 32 is press fit with the shaft tube 12 to simplify the structure of the dynamic pressure assembly 32 and the shaft tube 12. Besides, the dynamic pressure assembly 32 may include an engagement portion 32a and a dynamic pressure portion 32b. The extension portion 321 is located on the engagement portion 32a. The engagement portion 32a of the dynamic pressure assembly 32 abuts the bearing 31. The dynamic pressure portion 32b of the dynamic pressure assembly 32 is press fit with the shaft tube 12. The face of the dynamic pressure portion 32b facing the thrust plate 33 is provided with the dynamic pressure grooves 322 in order to form the lubricating fluid layer L between the dynamic pressure portion 32b and the thrust plate 33.

The dynamic pressure portion 32b may be formed by a flexible printed circuit board and a metal board. The flexible printed circuit board is coupled with one face of the metal board such that the metal board increases the strength of the dynamic pressure portion 32b. A surface of the flexible printed circuit board is provided with copper foil. Therefore, the dynamic pressure grooves 322 may be formed by etching the copper foil (chemical or laser etching) or by electroforming, simplifying the processing of the dynamic pressure grooves 322 while precisely controlling the width and depth of each dynamic pressure groove 322. As a result, precise formation of the dynamic pressure grooves 322 can be attained.

Figure 5:
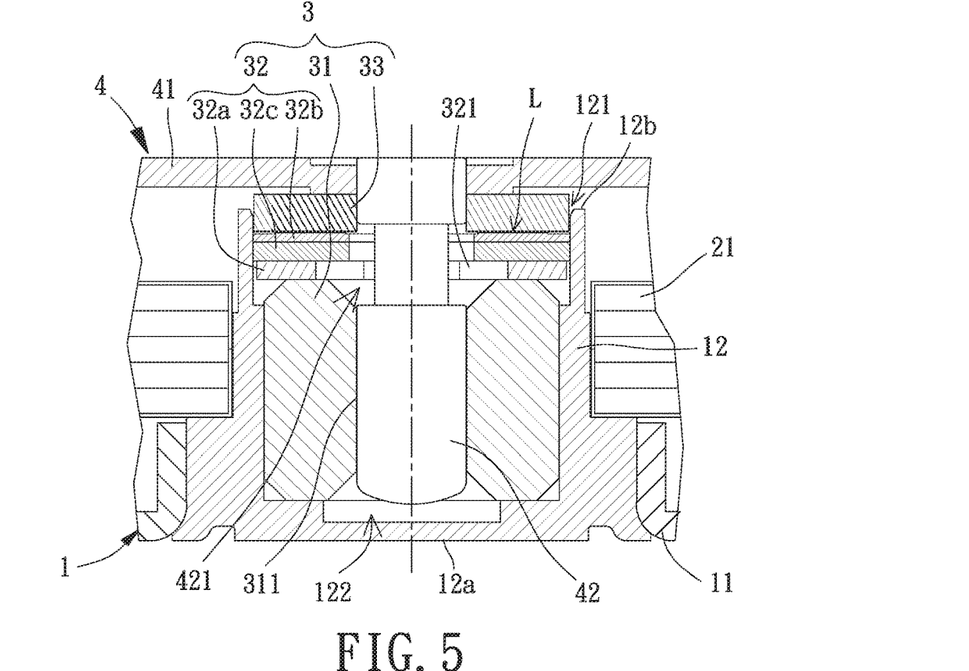
FIG. 5 is a partially enlarged, cross-sectional view of the motor including a dynamic pressure assembly having a reinforcing member.
Figure 6:
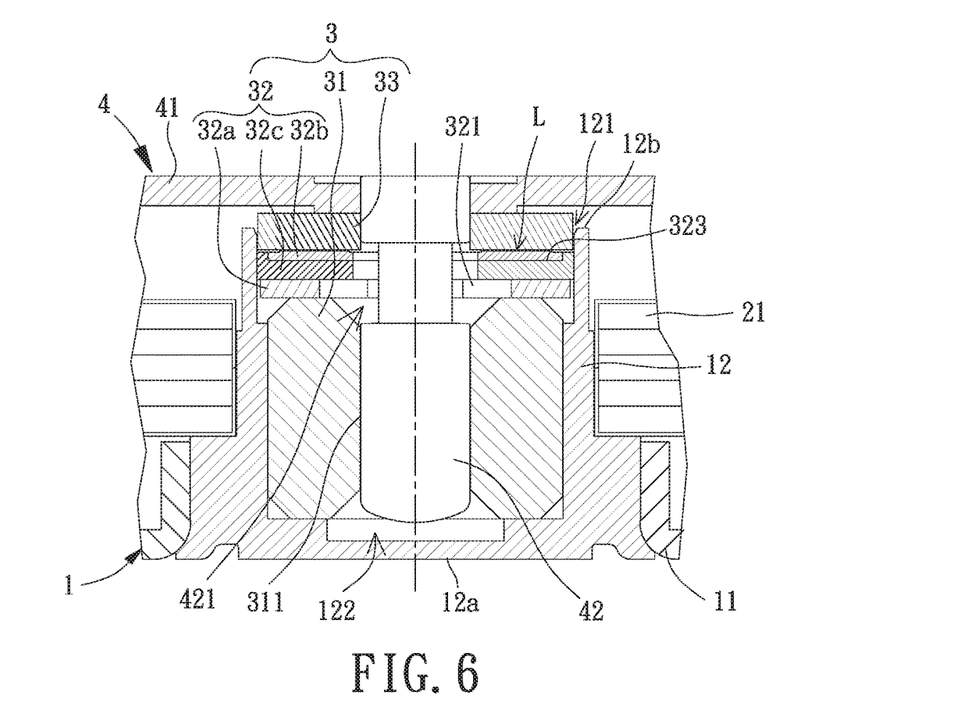
FIG. 6 is a partially enlarged, cross-sectional view of the motor including a dynamic pressure assembly having a reinforcing member with a receiving portion.

Besides, referring to FIGS. 5 and 6, the dynamic pressure assembly 32 may further include a reinforcing member 32c if the dynamic pressure portion 32b has a smaller thickness. The reinforcing member 32c is coupled with a bottom of the dynamic pressure portion 32b to increase the structural strength of the dynamic pressure assembly 32. In the example of FIG. 5, the reinforcing member 32c is a plate. In this regard, the outer peripheries of the dynamic pressure portion 32b and the reinforcing member 32c can be press fit with the shaft tube 12. In the example of FIG. 6, the reinforcing member 32c is a plate with a receiving portion 323. The dynamic pressure portion 32b is received in the receiving portion 323 to increase the engagement force between the dynamic pressure portion 32b and the reinforcing member 32c while the outer periphery of the reinforcing member 32c is press fit with the shaft tube 12.

Figure 4:
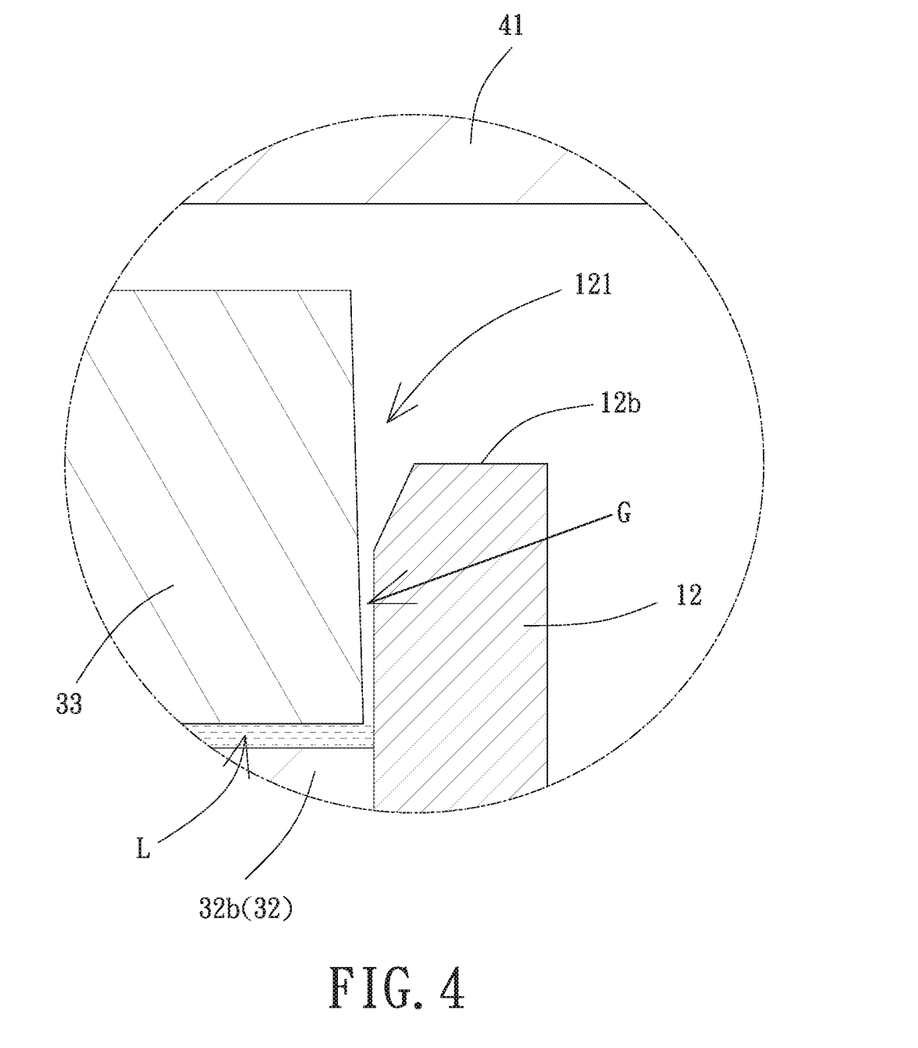
FIG. 4 is an enlarged view of the portion "A" in FIG. 3.

Referring to FIGS. 3 and 4, an outer periphery of the thrust plate 33 is spaced from an inner periphery of the shaft tube 12 to form an oil spacing G to be filled with the lubricating fluid. Thus, there is sufficient lubricating fluid between the dynamic pressure assembly 32 and the thrust plate 33 to form the lubricating fluid layer L. The oil spacing G gradually reduces from the top down to increase the convenience in filling the lubricating fluid. For example, the inner periphery of the shaft tube 12 may extend in an inclined manner at the open end 12b thereof. In the case, the inclined face on the inner periphery of the shaft tube 12 includes an upper end radially aligned with an end face of the open end 12b, as well as a lower end opposite to the upper end of the shaft tube 12. The upper end is relatively distant from a center of the shaft tube 12, and the lower end is relatively adjacent to the center of the shaft tube 12. In another case, the outer periphery of the thrust plate 33 may also extend in an inclined manner, in which the inclined face of the thrust plate 33 includes an upper end and a lower end opposite to the upper end of the thrust plate 33. In this regard, the upper end of the thrust plate 33 is relatively adjacent to the center of the shaft tube 12, and the lower end is relatively distant from the center of the shaft tube 12.

Figure 7:
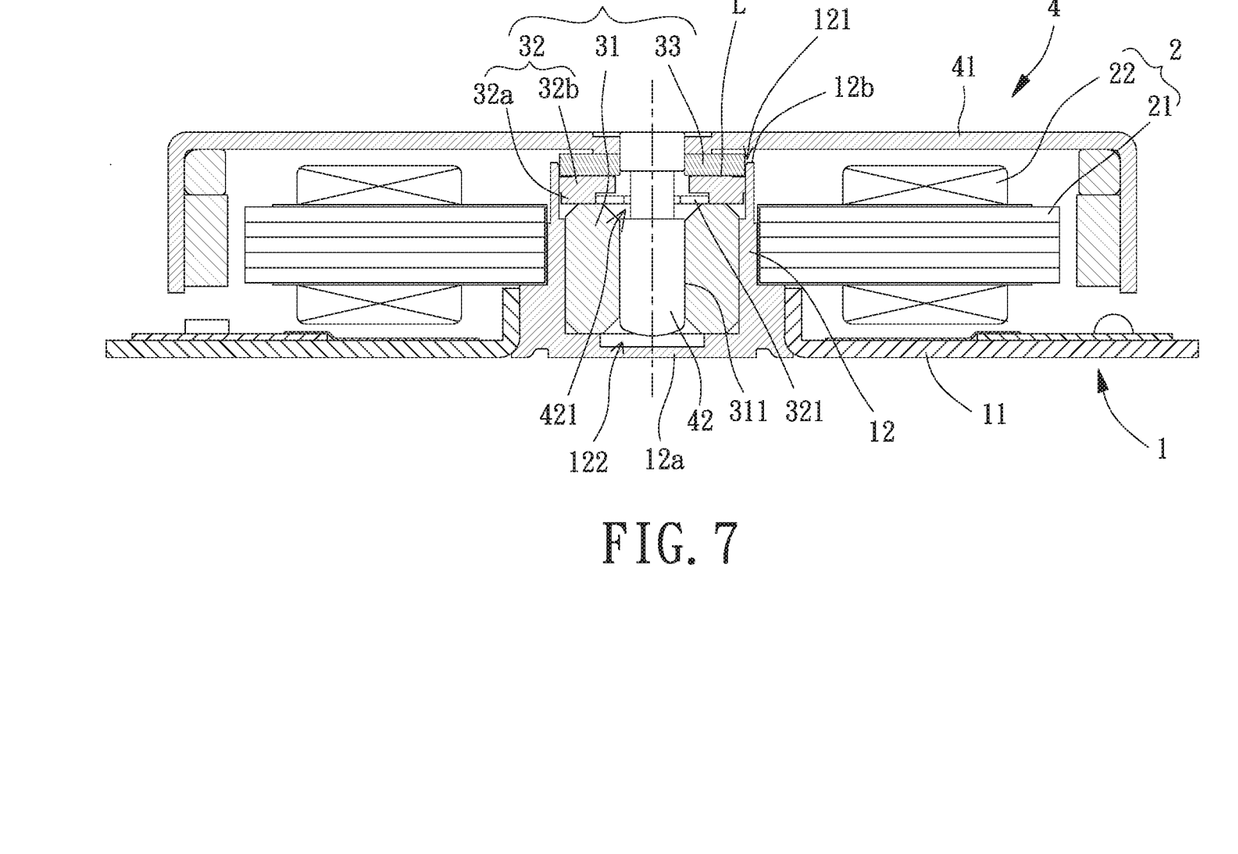
FIG. 7 is a cross-sectional, assembled view of a motor of a second embodiment according to the invention.

It is worth mentioning that the engagement portion 32a and the dynamic pressure portion 32b can be two independent components in this embodiment. The dynamic pressure portion 32b abuts an end face of the engagement portion 32a. Another end face of the engagement portion 32a abuts the bearing 31. In this manner, the convenience in respectively forming the engagement portion 32a and the dynamic pressure portion 32b is provided. Alternatively, referring to FIG. 7 which shows a second embodiment of the invention, the engagement portion 32a and the dynamic pressure portion 32b are integrally formed as a single component, or are adhered to each other in advance, to provide a convenient and efficient installation of the dynamic pressure assembly 32.

Referring to FIGS. 2 and 3, the rotor 4 is connected to the thrust plate 33 and is rotatably coupled with the bearing 31. In this embodiment, the rotor 4 includes a hub 41 and a shaft 42 coupled with the hub 41. The shaft 42 extends through the thrust plate 33 and the dynamic pressure assembly 32 and is rotatably received in the shaft hole 311 of the bearing 31. The shaft 42 does not abut the closed end 12a of the shaft tube 12, preventing the shaft 42 from making contact with the closed end 12a of the shaft tube 12 and ensuring a smooth rotation of the shaft 42. Furthermore, a bottom end of the shaft 42 preferably faces the recess 122 of the shaft tube 12. In this regard, even though the bottom end of the shaft 42 slightly protrudes beyond the bottom face of the bearing 31 during the assembly of the shaft 42, the bottom end of the shaft 42 will only extend into the recess 122 and will not make contact with the closed end 12a of the shaft tube 12. Advantageously, it can still be ensured that the shaft 42 does not make contact with the closed end 12a of the shaft tube 12 during the rotation of the shaft 42.

Besides, the hub 41 or the shaft 42 of the rotor 4 may be coupled with the thrust plate 33. Particularly, when the thrust plate 33 is made of metal material, the thrust plate 33 may be coupled to the shaft 42 by laser welding, increasing the coupling strength between the shaft 42 and the thrust plate 33. The shaft 42 may further include a neck 421. After the shaft 42 extends through the dynamic pressure assembly 32, the extension portion 321 of the dynamic pressure assembly 32 can extend into the neck 421 to limit the axial movement of the shaft 42.

Based on the above structure, during the assembly of the motor of the invention, the bearing 31 is inserted into the shaft tube 12 via the opening 121. In this regard, an end of the bearing 31 abuts the portion of the inner periphery of the shaft tube 12 located at the closed end 12a. Then, the dynamic pressure assembly 32 abuts another end of the bearing 31 and is received in the shaft tube 12, securely positioning the bearing 31 in the shaft tube 12. Moreover, the thrust plate 33 is connected to the rotor 4, and the shaft 42 extends through the thrust plate 33. The stator 2 is coupled with the base 1 and is mounted around the shaft tube 12. Next, the assembly is completed as soon as the shaft 42 extends through the dynamic pressure assembly 32 and the shaft hole 311 of the bearing 31.

In the above, since the bottom end of the shaft tube 12 is designed in a closed form, it is not required to seal the bottom end of the shaft tube 12 after the dynamic pressure bearing unit 3 is inserted into the shaft tube 12. Furthermore, since the installation location of the dynamic pressure assembly 32 is near the open end 12b of the shaft tube 12 which is not deep into the bottom end of the shaft tube 12, the installation of the dynamic pressure assembly 32 is fast, precise and convenient. Moreover, the thrust plate 33 can be used to provide a supporting effect to the shaft 42 of the rotor 4, such that the rotor 4 can rotate more stably. Advantageously, the abrasion of the components can be reduced, thus prolonging the service life of the motor, reducing the noise of the motor and improving the performance of the motor.

Figure 8:
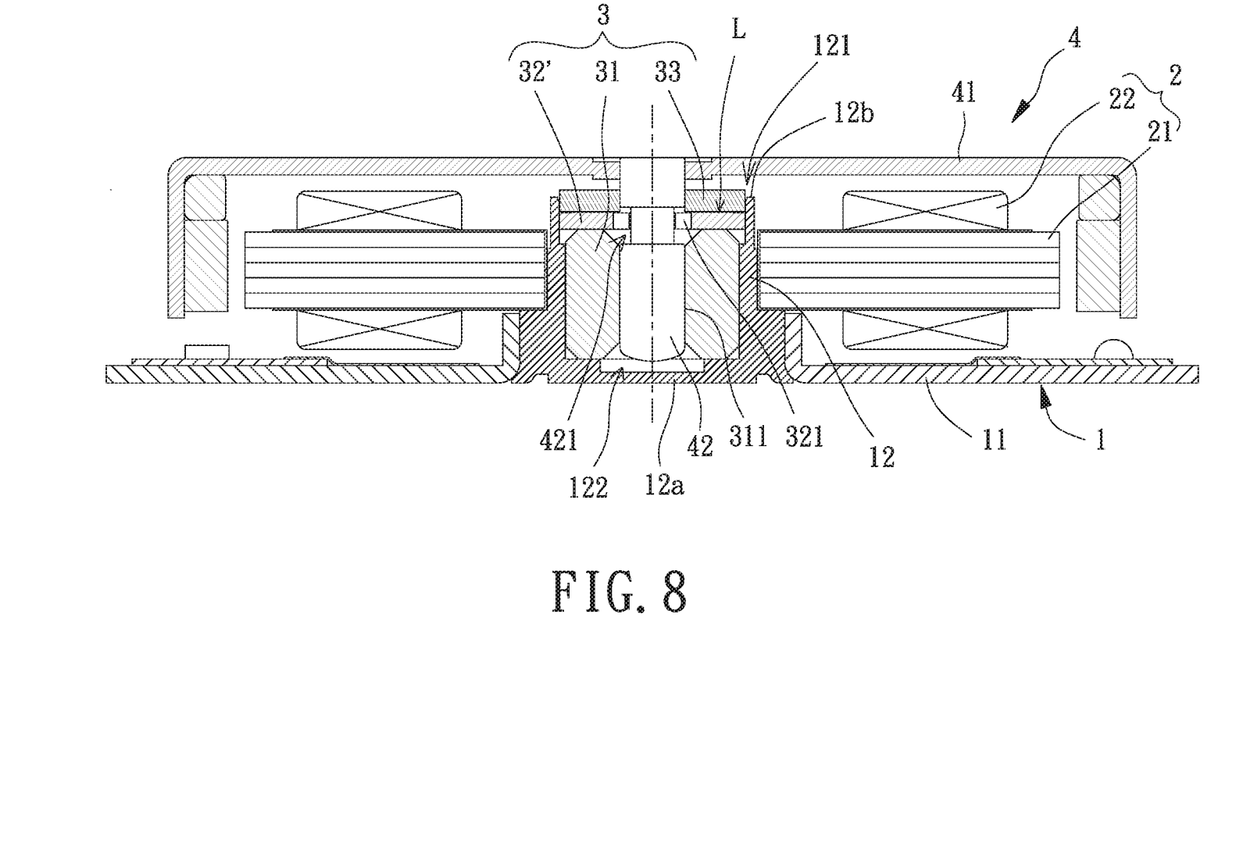
FIG. 8 is a cross-sectional, assembled view of a motor of a third embodiment according to the invention.

FIG. 8 shows a motor of a third embodiment according to the invention. The third embodiment is substantially the same as the first embodiment except for the configuration of the dynamic pressure assembly 32'.

Specifically, the dynamic pressure assembly 32' in this embodiment is formed by integrating the engagement portion 32a and the dynamic pressure portion 32b of the first embodiment (please refer to FIG. 2) as a thin plate. In this regard, the outer periphery of the dynamic pressure assembly 32' is coupled with the shaft tube 12 while an end face of the dynamic pressure assembly 32' abuts the bearing 31. Then, the dynamic pressure grooves 322 are arranged on another end face of the dynamic pressure assembly 32', such that the lubricating fluid layer L is formed between the dynamic pressure grooves 322 and the thrust plate 33. Besides, an extension portion 321 can also be formed on an inner periphery of the dynamic pressure assembly 32'. The extension portion 321 is configured to be inserted into the neck 421. Based on this, the dynamic pressure assembly 32' can be more lightweight, advantageously achieving the reduction in the axial height of the motor.

Figure 9:
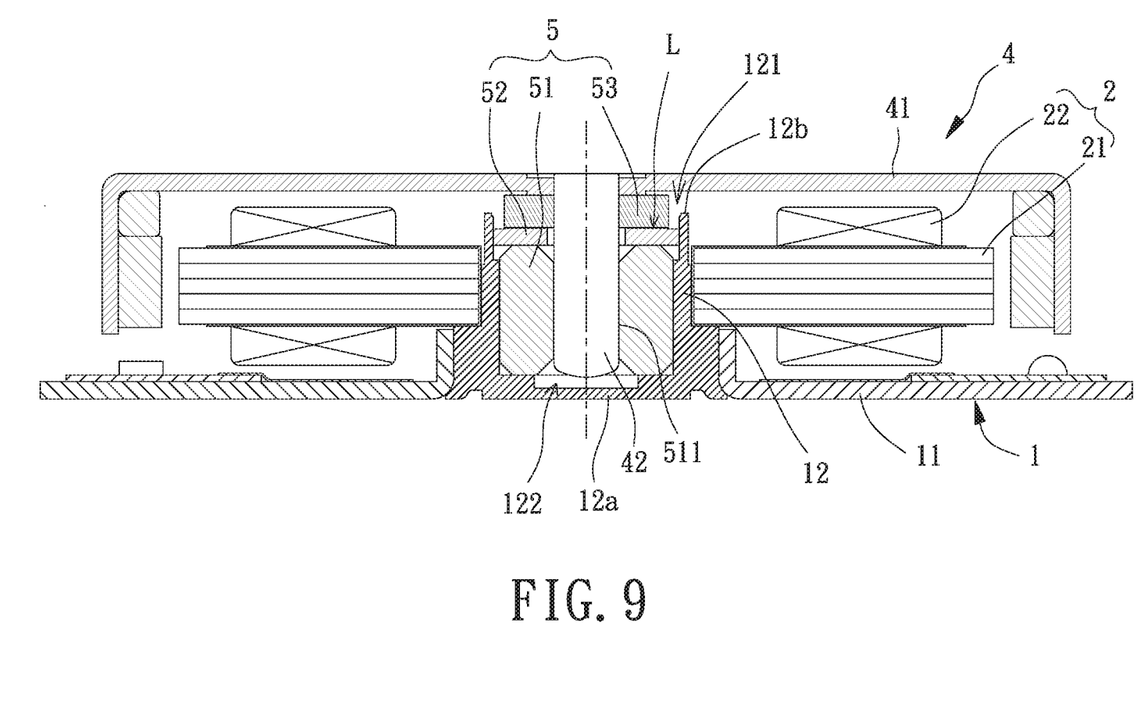
FIG. 9 is a cross-sectional, assembled view of a motor of a fourth embodiment according to the invention.

FIG. 9 shows a motor of a fourth embodiment according to the invention. The fourth embodiment is substantially the same as the first embodiment except for the configuration of the dynamic pressure bearing unit 5.

Specifically, the dynamic pressure bearing unit 5 includes a bearing 51, a dynamic pressure assembly 52 and a thrust plate 53. The bearing 51 is received in the shaft tube 12. The bearing 51 includes a shaft hole 511. The shaft 42 extends through the shaft hole 511 and is rotatably coupled with the bearing 51. The dynamic pressure assembly 52 and the thrust plate 53 are mounted adjacent to the open end 12b of the shaft tube 12. The dynamic pressure assembly 52 is located between the thrust plate 53 and the bearing 51. In this embodiment, the dynamic pressure assembly 52 is fit with the shaft tube 12 and abuts an end of the bearing 51 relatively adjacent to the opening 121. The thrust plate 53 is connected to the rotor 4. There is a lubricating fluid layer L between the dynamic pressure assembly 52 and the thrust plate 53, permitting the thrust plate 53 to jointly rotate with the rotor 4 relatively to the dynamic pressure assembly 52 more smoothly. In this embodiment, an inner periphery of the dynamic pressure assembly 52 is not provided with any structure which limits the axial movement of the rotor 4. Thus, the dynamic pressure assembly 52 has a simpler structure, increasing the convenience in the manufacturing process and the assembly process.

Figure 10:
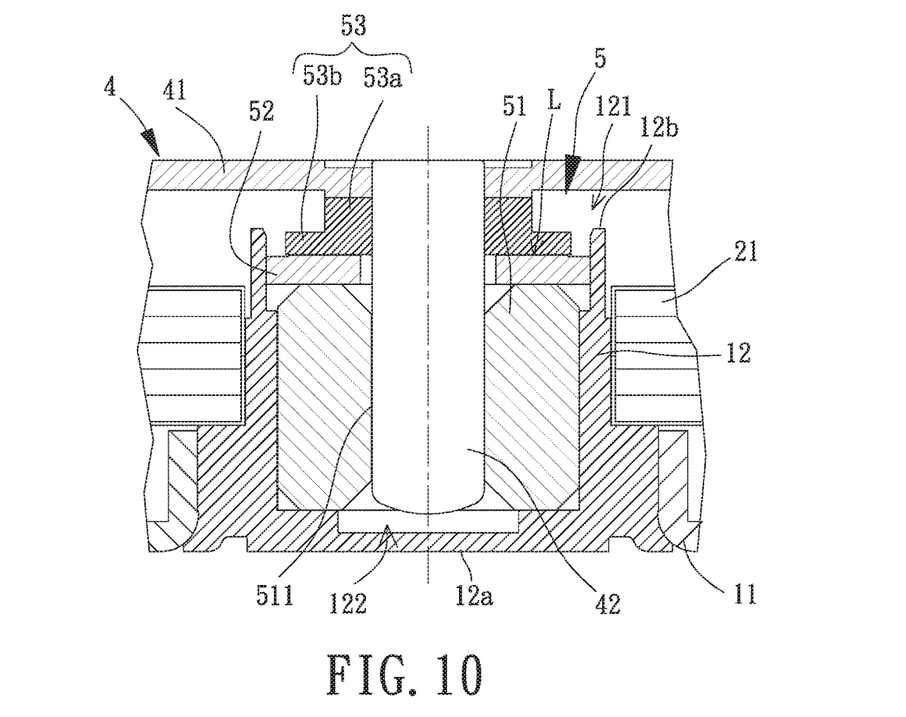
FIG. 10 is a partially enlarged, cross-sectional view of a motor of a fifth embodiment according to the invention.

FIG. 10 shows a motor of a fifth embodiment according to the invention. The fifth embodiment is substantially the same as the fourth embodiment except for the configuration of the thrust plate 53.

Specifically, the thrust plate 53 in this embodiment includes a narrow portion 53a and a broad portion 53b connected to the narrow portion 53a. The narrow portion 53a and the broad portion 53b are arranged in an axial direction of the motor. The narrow portion 53a has a diameter smaller than a diameter of the broad portion 53b. The lubricating fluid layer L forms between the broad portion 53b and the dynamic pressure assembly 52. The level of the broad portion 53b is not higher than the end face of the open end 12b in order to reduce the amount of the lubricating fluid spilling from inside the shaft tube 12.

Figure 11:
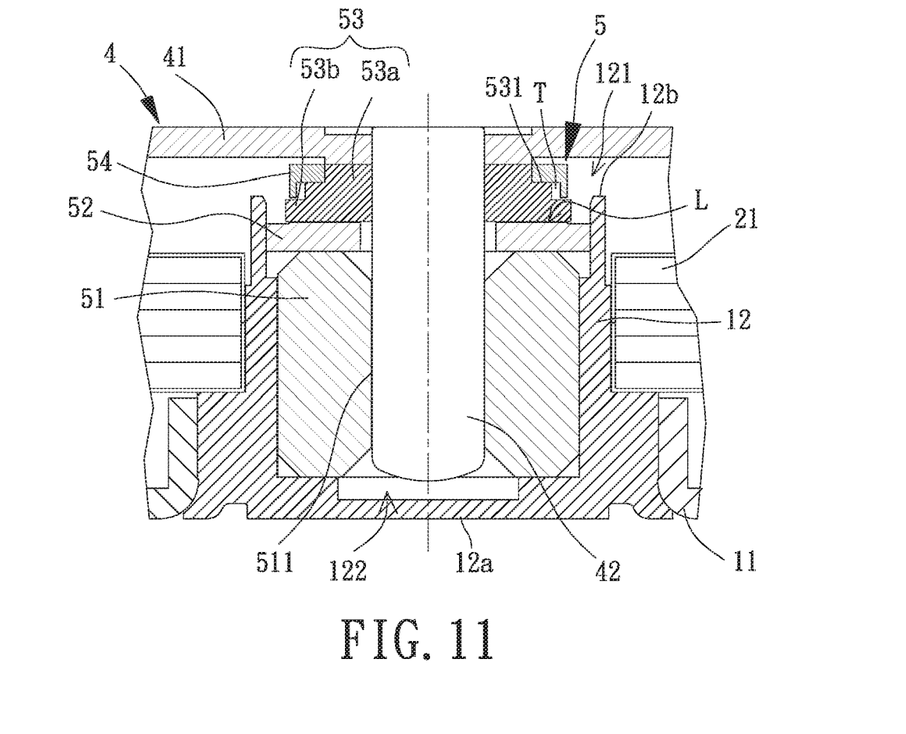
FIG. 11 shows the motor of FIG. 10 with the addition of a cover.

Alternatively, referring to FIG. 11, a cover 54 may be coupled with the thrust plate 53 in order to form an oil chamber T between the cover 54 and the thrust plate 53. In the arrangement, the lubricating fluid rushing upwards can be kept in the oil chamber T and does not spill easily. The cover 54 may couple with the narrow portion 53a of the thrust plate 53. The cover 54 is spaced from a top face of the broad portion 53b at a small gap to permit the lubricating fluid to flow into the oil chamber T via the gap. In a preferred case, the narrow portion 53a forms a shoulder portion 531 to be abutted by the cover 54, preventing the cover 54 from making contact with the top face of the broad portion 53b and ensuring the lubricating fluid to smoothly flow into the oil chamber T.

It is noted that the configurations of the thrust plates 53 in the fourth and fifth embodiments (referring to FIGS. 10 and 11) can also be applied to the thrust plates 53 in the first, second and third embodiments (referring to FIGS. 3 and 7-9).

Figure 12:
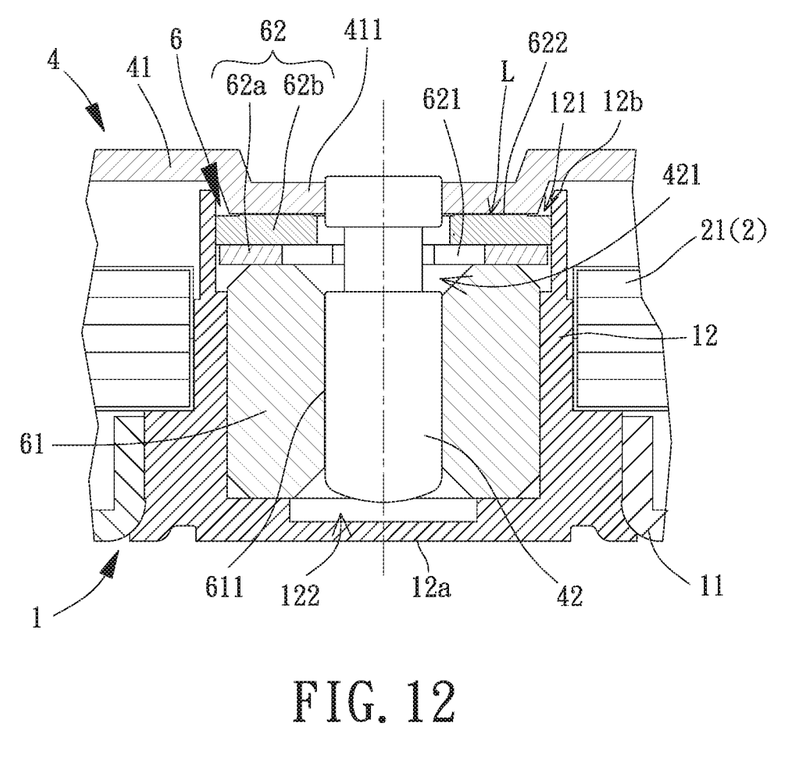
FIG. 12 is a partially enlarged, cross-sectional view of a motor of a sixth embodiment according to the invention.

FIG. 12 shows a motor of a sixth embodiment according to the invention. The sixth embodiment is substantially the same as the first embodiment except for that the dynamic pressure bearing unit in this embodiment is not provided with the thrust plate of the previous embodiment.

Specifically, the motor in the embodiment includes a base 1 having a shaft tube 12, a stator 2, a dynamic pressure bearing unit 6 and a rotor 4. The shaft tube 12 includes a closed end 12a and an open end 12b. The open end 12b includes an opening 121. The stator 2 is mounted around the shaft tube 12. The dynamic pressure bearing unit 6 includes a bearing 61 and a dynamic pressure assembly 62. The bearing 61 is received in the shaft tube 12. The dynamic pressure assembly 62 is mounted relatively adjacent to an open end 12b of the shaft tube 12. The rotor 4 includes a hub 41 and a shaft 42. The hub 41 includes a thrust portion 411. The shaft 42 may be coupled with the thrust portion 411 of the hub 41. The shaft 42 extends through the dynamic pressure assembly 62 and is rotatably received in a shaft hole 611 of the bearing 61. The thrust portion 411 of the hub 41 preferably extends into the shaft tube 12. There exists a lubricating fluid layer L between the thrust portion 411 and the dynamic pressure assembly 62. Based on this, the motor in this embodiment can not only improve the convenience in assembly as stated above, but also simplify the structure of the motor to reduce the manufacturing cost.

Similar to the first embodiment, the dynamic pressure assembly 62 in this embodiment includes an extension portion 621 on an inner periphery thereof. In this regard, the shaft 42 includes a neck 421. After the shaft 42 extends through the dynamic pressure assembly 62, the extension portion 621 of the dynamic pressure assembly 62 can extend into the neck 421 to limit the axial movement of the shaft 42. Furthermore, the dynamic pressure assembly 62 can include an engagement portion 62a and a dynamic pressure portion 62b. The extension portion 621 is formed on the engagement portion 62a. The engagement portion 62a of the dynamic pressure assembly 62 abuts the bearing 61. The dynamic pressure portion 62b of the dynamic pressure assembly 62 is press fit with the shaft tube 12 and includes a face facing the thrust portion 411 and having a plurality of dynamic pressure grooves 622. As a result, the lubricating fluid layer L is formed between the dynamic pressure portion 62b and the thrust portion 411.

In conclusion, the motor according to the invention can prevent leakage of the lubricating fluid through the arrangement of the closed end of the shaft tube while positioning the dynamic pressure bearing unit in a position adjacent to the open end of the shaft tube. In this arrangement, it is not necessary to push the dynamic pressure bearing unit to the closed end of the shaft tube, significantly improving the convenience in assembly of the motor.

Although the invention has been described in detail with reference to its presently preferable embodiments, it will be understood by one of ordinary skill in the art that various modifications can be made without departing from the spirit and the scope of the invention, as set forth in the appended claims.

What is claimed is:
1. A motor comprising:
    a base including a shaft tube, wherein the shaft tube includes a closed end and an open end;
    a stator mounted around the shaft tube;
    a dynamic pressure bearing unit including a bearing, a dynamic pressure assembly and a thrust plate, wherein the bearing is received in the shaft tube, wherein the dynamic pressure assembly and the thrust plate are disposed in a position relatively adjacent to the open end of the shaft tube and relatively distant from the closed end of the shaft tube, wherein an outer periphery of the thrust plate is spaced from an inner periphery of the shaft tube to form an oil spacing, wherein the dynamic pressure assembly is located between the bearing and the thrust plate, and wherein a lubricating fluid layer is disposed between the dynamic pressure assembly and the thrust plate; and
    a rotor connected to the thrust plate and rotatably coupled with the bearing.

2. The motor as claimed in claim 1, wherein the oil spacing gradually reduces from an upper position relatively adjacent to the open end of the shaft tube to a lower position relatively distant from the open end of the shaft tube.

3. The motor as claimed in claim 1, wherein the lubricating fluid layer has a thickness of 0.01-0.1 mm.

4. The motor as claimed in claim 1, wherein the thrust plate includes a narrow portion and a broad portion connected to the narrow portion, wherein the narrow portion and the broad portion are arranged in an axial direction, wherein the lubricating fluid layer forms between the broad portion and the dynamic pressure assembly, and wherein a level of the broad portion is not higher than an end face of the open end of the shaft tube.

5. The motor as claimed in claim 4, wherein the dynamic pressure bearing unit further includes a cover coupled with the narrow portion of the thrust plate, and wherein an oil chamber is formed between the cover and the thrust plate.

6. The motor as claimed in claim 5, wherein the narrow portion forms a shoulder portion, wherein the cover abuts the shoulder portion to prevent the cover from making contact with the broad portion.

7. The motor as claimed in claim 1, wherein the rotor includes a shaft extending through the thrust plate and the dynamic pressure assembly and rotatably coupled with the bearing.

8. The motor as claimed in claim 7, wherein the thrust plate is coupled with the shaft.

9. The motor as claimed in claim 8, wherein the thrust plate is coupled to the shaft by laser welding.

10. The motor as claimed in claim 7, wherein the rotor includes a hub coupled with the shaft, and wherein the thrust plate is coupled with the hub.

11. The motor as claimed in claim 7, wherein the shaft does not abut the closed end of the shaft tube.

12. The motor as claimed in claim 11, wherein a recess is formed on a portion of an inner periphery of the shaft tube located at the closed end, and wherein a bottom end of the shaft faces the recess of the shaft tube.

13. The motor as claimed in claim 7, wherein a face of the dynamic pressure assembly facing the thrust plate includes a plurality of dynamic pressure grooves.

14. The motor as claimed in claim 13, wherein the shaft includes a neck, and wherein an inner periphery of the dynamic pressure assembly forms an extension portion extending into the neck.

15. The motor as claimed in claim 14, wherein the dynamic pressure assembly includes an engagement portion and a dynamic pressure portion, wherein the extension portion is located on the engagement portion, wherein the engagement portion of the dynamic pressure assembly abuts the bearing, wherein the dynamic pressure portion of the dynamic pressure assembly is coupled with the shaft tube, wherein a face of the dynamic pressure portion of the dynamic pressure assembly facing the thrust plate includes the plurality of dynamic pressure grooves, and wherein the lubricating fluid layer is formed between the dynamic pressure portion and the thrust plate.

16. The motor as claimed in claim 15, wherein the engagement portion includes an end face abutting the dynamic pressure portion, as well as another end face abutting the bearing.

17. The motor as claimed in claim 15, wherein the engagement portion and the dynamic pressure portion are integrally formed with each other.

18. The motor as claimed in claim 15, wherein the dynamic pressure assembly is a thin plate.

19. The motor as claimed in claim 15, wherein the dynamic pressure assembly includes a reinforcing member coupled with a bottom of the dynamic pressure portion.

20. The motor as claimed in claim 19, wherein the reinforcing member is a plate, and wherein an outer periphery of the dynamic pressure portion and an outer periphery of the reinforcing member are press fit with the shaft tube.

21. The motor as claimed in claim 19, wherein the reinforcing member is a plate with a receiving portion, wherein the dynamic pressure portion is received in the receiving portion, and wherein an outer periphery of the reinforcing member is press fit with the shaft tube.

22. A motor comprising:
a base including a shaft tube, wherein the shaft tube includes a closed end and an open end, and wherein the open end of the shaft tube has an opening;
a stator mounted around the shaft tube;
a dynamic pressure bearing unit including a bearing, a dynamic pressure assembly and a thrust plate, wherein the bearing is received in the shaft tube, wherein the dynamic pressure assembly is coupled with the shaft tube and abuts an end of the bearing facing the opening, wherein the dynamic pressure assembly and the thrust plate are disposed in a position relatively adjacent to the open end of the shaft tube and relatively distant from the closed end of the shaft tube, wherein the dynamic pressure assembly is located between the bearing and the thrust plate, and wherein a lubricating fluid layer is disposed between the dynamic pressure assembly and the thrust plate; and
a rotor connected to the thrust plate and rotatably coupled with the bearing.

23. The motor as claimed in claim 22, wherein an outer periphery of the dynamic pressure assembly is coupled with an inner periphery of the shaft tube.

24. A motor comprising:
a base including a shaft tube, wherein the shaft tube includes a closed end and an open end;
a stator mounted around the shaft tube;
a dynamic pressure bearing unit including a bearing and a dynamic pressure assembly, wherein the bearing is received in the shaft tube, wherein the dynamic pressure assembly is disposed in a position relatively adjacent to the open end of the shaft tube and relatively distant from the closed end of the shaft tube; and
a rotor including a hub and a shaft, wherein the shaft extends through the dynamic pressure assembly and is rotatably coupled with the bearing, wherein the hub is coupled with the shaft and includes a thrust portion, and wherein a lubricating fluid layer is disposed between the thrust portion and the dynamic pressure assembly.

25. The motor as claimed in claim 24, wherein the shaft includes a neck, and wherein an inner periphery of the dynamic pressure assembly forms an extension portion extending into the neck.

26. The motor as claimed in claim 25, wherein the dynamic pressure assembly includes an engagement portion and a dynamic pressure portion, wherein the extension portion is located on the engagement portion, wherein the engagement portion of the dynamic pressure assembly abuts the bearing, wherein the dynamic pressure portion of the dynamic pressure assembly is coupled with the shaft tube, wherein a face of the dynamic pressure portion facing the thrust portion includes a plurality of dynamic pressure grooves, and wherein the lubricating fluid layer is formed between the dynamic pressure portion and the thrust portion.

* * * * *